(12) United States Patent
Loehn et al.

(10) Patent No.: US 9,351,609 B2
(45) Date of Patent: May 31, 2016

(54) DEVICE AND METHOD FOR CENTRIFUGING A FOOD PRODUCT

(75) Inventors: Mirko Loehn, Königslutter (DE); Erik Van Loon, Nieuwendijk (NL)

(73) Assignee: Florigo International B. V., Woerden (NL)

( * ) Notice: Subject to any disclaimer, the term of this patent is extended or adjusted under 35 U.S.C. 154(b) by 195 days.

(21) Appl. No.: 14/233,341

(22) PCT Filed: Jul. 20, 2012

(86) PCT No.: PCT/EP2012/064263
§ 371 (c)(1),
(2), (4) Date: Apr. 15, 2014

(87) PCT Pub. No.: WO2013/017437
PCT Pub. Date: Feb. 7, 2013

(65) Prior Publication Data
US 2014/0212560 A1   Jul. 31, 2014

(30) Foreign Application Priority Data

Jul. 21, 2011 (EP) .................................. 11174869

(51) Int. Cl.
*A47J 43/07* (2006.01)
*B04B 5/10* (2006.01)
*B04B 11/05* (2006.01)
(Continued)

(52) U.S. Cl.
CPC ............... *A47J 43/07* (2013.01); *A23L 1/0107* (2013.01); *A23L 1/1645* (2013.01); *B04B 3/00* (2013.01); *B04B 5/10* (2013.01); *B04B 7/08* (2013.01); *B04B 11/00* (2013.01); *B04B 11/04* (2013.01);
(Continued)

(58) Field of Classification Search
CPC ....... A23L 1/0107; A23L 1/1645; B04B 3/00;
B04B 11/00; B04B 11/04; B04B 11/05;
B04B 5/10; B04B 15/08; B04B 7/08; A47J 43/07; F26B 5/08
See application file for complete search history.

(56) References Cited

U.S. PATENT DOCUMENTS

| | | | |
|---|---|---|---|
| 3,888,973 A * | 6/1975 | Colwell ..................... | B01J 8/10 205/101 |
| 5,307,567 A | 5/1994 | Schnake et al. | |
| 2002/0078868 A1* | 6/2002 | McHenry .................. | F23K 1/00 110/342 |

FOREIGN PATENT DOCUMENTS

| | | |
|---|---|---|
| DE | 3425955 | 2/1985 |
| EP | 0550405 | 7/1993 |

(Continued)

OTHER PUBLICATIONS

English Translation for DE3425955 published 2-1.*
(Continued)

*Primary Examiner* — Anthony Weier
(74) *Attorney, Agent, or Firm* — Jones Day

(57) ABSTRACT

The invention relates to a device for centrifuging at least one food product having at least one conveyance means (7, 7a, 7b) and at least one centrifuge element (9a, 9b) having an interior space (15a, 15b) to receive the food product and being adapted to be spun around a first rotational axis, wherein the food product is conveyable into the internal space via the conveyance means, wherein the conveyance means is at least partly insertable into and extricable out of the interior space, as well as a method for centrifuging at least one food product using said device.

45 Claims, 7 Drawing Sheets

(51) Int. Cl.

| | | |
|---|---|---|
| *B04B 15/08* | (2006.01) | |
| *B04B 11/00* | (2006.01) | |
| *A23L 1/01* | (2006.01) | |
| *A23L 1/164* | (2006.01) | |
| *B04B 3/00* | (2006.01) | |
| *B04B 7/08* | (2006.01) | |
| *B04B 11/04* | (2006.01) | |
| *F26B 5/08* | (2006.01) | |

(52) U.S. Cl.
CPC ............... *B04B 11/05* (2013.01); *B04B 15/08* (2013.01); *F26B 5/08* (2013.01)

(56) References Cited

FOREIGN PATENT DOCUMENTS

| | | | |
|---|---|---|---|
| EP | 1283680 | | 2/2003 |
| EP | 2548650 | | 1/2013 |
| GB | 285061 | * | 4/1928 |
| JP | B-S09-002498 | | 9/1934 |
| JP | B-S29-004136 | | 7/1954 |
| JP | A-S49-060473 | | 6/1974 |
| JP | A-S54-100383 | | 8/1979 |
| JP | A-S62-153008 | | 7/1987 |
| JP | 63296648 | | 12/1988 |
| JP | A-H03-109013 | | 5/1991 |
| JP | A-H10-071343 | | 3/1998 |
| SU | 486798 | * | 1/1976 |
| SU | 772514 | * | 10/1980 |
| WO | WO 01/91580 | | 12/2001 |
| WO | WO 2006/094831 | | 9/2006 |

OTHER PUBLICATIONS

Derwent Abstract for SU 772514 publisehd Oct. 1980.*
Official Action for Japanese Application No. 2014-520673 with English translation.
Communication pursuant to Article 93(3) EPC dated Feb. 6, 2015 for EP 12741292.2.
Notice of Preliminary Rejection dated Apr. 15, 2015 for Korean Application No. 10-2014-7004459 (with English translation).
International Search Report dated Nov. 23, 2012 for PCT/EP2012/064263.
European Search Report dated Jan. 27, 2012 for 11174869.5.

* cited by examiner

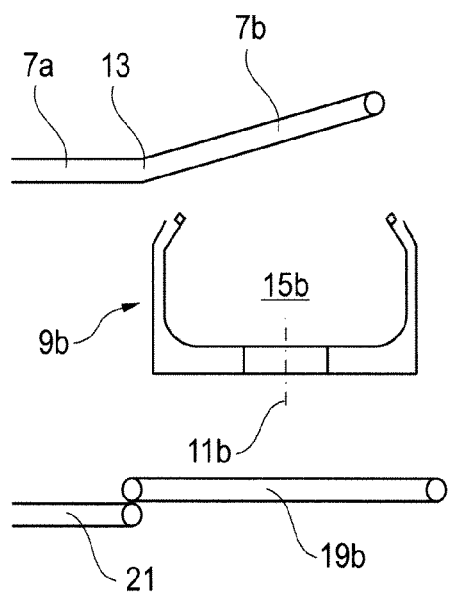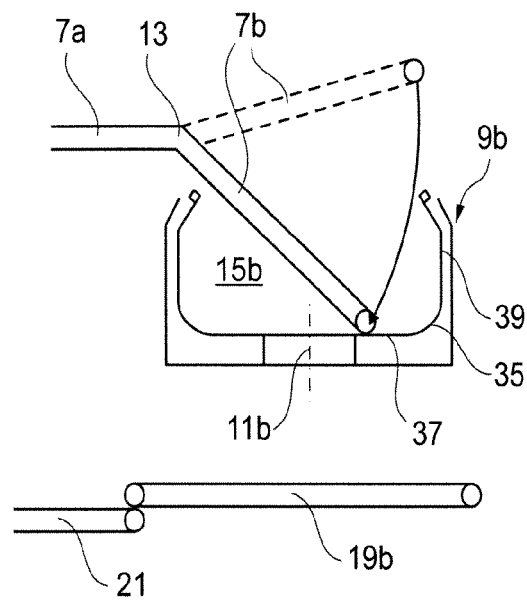
Fig. 3a Fig. 3b
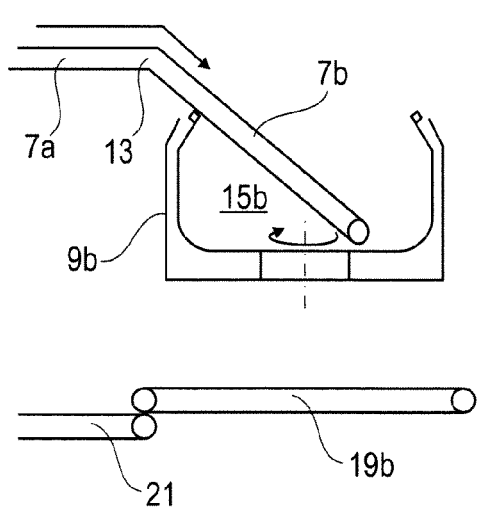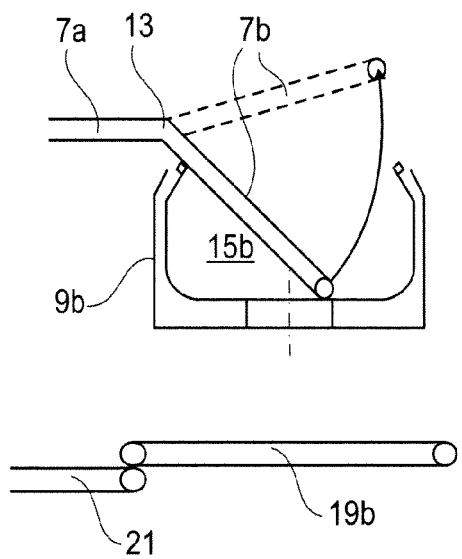
Fig. 3c Fig. 3d

DEVICE AND METHOD FOR CENTRIFUGING A FOOD PRODUCT

CROSS REFERENCE TO RELATED APPLICATIONS

This application is the National Phase application of International Application No. PCT/EP2012/064263, filed Jul. 21, 2012, which designates the United States and was published in English, and claims priority to European Patent Application No. 11174869.5 filed on Jul. 21, 2011. These applications, in their entirety, are incorporated herein by reference.

The invention relates to a device for centrifuging at least one food product comprising at least one conveyance means and at least one centrifuge element having an interior space to receive the food product and being adapted to be spun around a first rotational axis, wherein the food product is conveyable into the internal space via the conveyance means; as well as a method for centrifuging at least one food product, especially utilizing a device according to one of the preceding claims, wherein the food product is conveyed to at least one centrifuge element, having an interior space to receive the food product and being adapted to be spun around a first rotational axis, by at least one conveyance means.

During the production of food products the food products undergo treatments with respective fluids. For example food products are cleaned by washing in water, also some food products are pre-fried or fried by moving them through heated liquid fat. Also some products have from nature a quite comprehensive moisture content. Before such products are further treated the moisture content, wherein moisture content means the moisture in form of water enclosed within the product, and/or the content of other liquids, especially fat, enclosed within the food product as well the amount of fat and/or moisture and/or liquid located on a food product surface, especially the fat content enclosed within a food product and fat located on a food product surface due to a frying process, should be reduced.

For example fried snack food products like potato slices, potato sticks, vegetable slices, vegetable sticks, fruit slices, fruit sticks, nuts, snack pellets or pre fabricated dough products produced from dried potatoes, cereals, spices and other ingredients may have a moisture (water) content, of 1% to 3% of weight after a frying process, however have additionally an amount of further liquid, like fat enclosed within the food product and liquid, like fat, located on a food product surface. These food products or especially other potato products like potato parts or whole potatoes and all kinds of vegetable products, red beet, parsnip, carrot, beans or the like, may also be provided as pre-fried food products wherein the amount of liquid, like fat, enclosed within the food product and liquid, like fat, located on a food product surface after pre-frying is lower than 90% of weight, particularly between 10 to 70% of weight. Other food products like the above mentioned potato products, vegetable products, nuts or also fruit products, like whole fruits, fruit slices, fruit parts, might be provided as non-fried-food-products having an increased moisture content in form of surface water, so that the centrifuge might also be used for dewatering of raw vegetable products or pre-cooked vegetable products. Thus for all of these products it might be wanted to reduce the moisture content and/or surface liquid, especially to reduce a fat content of the fried or pre-fried products.

As for example disclosed in EP 1 283 680 B1, relating to a device and a method for frying products, after the frying process the food products are transferred to a generic device for centrifuging the products to reduce the moisture content. It is proposed that the food products are, after they have been moved through a liquid fat, transported via an conveyor to a cross belt which moves the food products either to one of two centrifuges. In the centrifuges by spinning a separation of the liquid, especially fat, is achieved. To improve a charging of a food product in form of chips respective centrifuge vessels are placed at an angle of about 30° to the vertical and the cross belt terminates above an opening of the respective centrifuge vessel such that the food product can fall into the centrifuge vessel. After the food product has been spun within the centrifuge vessel a bottom valve of the centrifuge vessel is opened such that the food product can immediately be discharged directly into a sluice chamber. From there the food products is discharged via a bottom valve.

Especially as food products after a frying process have a quite high temperature, for example after a frying process in an atmospheric pressure in a range of 140° C. to 180° C., for example 150° C., or under vacuum conditions, especially with a pressure below atmospheric pressure and down to 10 mbar, particularly 20 to 200 mbar, in the range of 90° C. to 150° C., for example 130° C., and have after the centrifuging still a temperature of more than 100° C. in case of an atmospheric pressure and above 50° C. when in a vacuum pressure the food products are prone to breakage when exposed to mechanical stresses or impacts.

Especially the device and the method disclosed in EP 1 283 680 B1 leads to a high breakage ratio of the food products. In respective trials it was found that the food product running through the different handling steps from the exit of the fryer to the distributing system, especially during the transfer from the belt into the centrifuge vessel as well as during start and stop of the centrifuging as the discharge out of the centrifuge vessel and via the respective belts leads to the result that a survival index determined based on the percentage by weight of non broken products was only about 55%.

It is thus an object of the claimed subject-matter to overcome the disadvantages known in the state of the art, especially to provide a device and a method for centrifuging a food product that lead to an increased survival index, especially reduces the ratio of broken food products during the transfer to a centrifuge element as well as the centrifuging and a transfer from the centrifuge element to an output of the device.

With regard to the device this object is achieved in that the conveyance means is at least partly insertable into and extricable out of the interior space.

It is furthermore proposed that the conveyance means comprises at least one supply means that is at least partly positionable within the interior space by at least partly moving the supply means and/or by, especially telescopically, altering a length of the supply means.

Inventive devices may also be characterized by at least two, preferably a plurality of, centrifuge elements, wherein the food product is conveyable alternatively to one of the centrifuge elements, especially the supply means is alternatively positionable at least partly in one of the centrifuge elements and/or is actuatable in reverse directions and/or the conveyance means comprises at least one dividing element to alternatively convey the food product, especially by reverse direction actuation, to at least two, especially a plurality, of supply means, wherein via each of the supply means the food product is conveyable to a respective centrifuge element to which the supply means is attributed.

In the before mentioned embodiment it is preferred that the supply means and the dividing element are at least partly one-piece, and/or the supply means is movable, especially turnable, preferably with respect to the dividing element and/ or with respect to horizontal axis, preferably around a second rotational axis, especially being perpendicular to the first rotational axis and/or via a hinged connection, especially between the supply means and the dividing element.

Furthermore it is proposed that the food product is provided as a fried product to the conveyance means, especially via at least one fryer conveyance device, as a raw material and/or non-fried material to the conveyance means, especially via at least one product providing means, and/or the food product is provided to the conveyance means through a first valve means, especially comprising at least one rotary valve and/or rotary air lock, preferably positioned above the conveyance means and/or a feed means, like a feed belt.

The inventive device may be the further characterized in that the centrifuge element comprises at least one opening, preferably one single opening, through which the food product is conveyed into and/or conveyed out of the centrifuge element, wherein preferably in a filling position and/or a centrifuging position of the centrifuge element the opening is mainly oriented upwards and/or in a discharging position of the centrifuge element mainly oriented downwards.

In the before mentioned embodiment it is preferred that the opening has an inner diameter, especially being smaller than the maximum inner diameter of the interior space, and/or has at least partly a conical cross sectional shape, especially the inner diameter of the opening is about 70% to 90%, more preferred about 75% to 85% and most preferred about 80% of the inner diameter of the interior space, the opening has a cone angle of 20° to 40°, preferably 25° to 35°, most preferred 33.5° with respect to the first rotational axis, the opening has a cone length of 10% to 50%, preferably 20% to 40%, most preferred about 30% of the height of the centrifuge element, especially a cone length of about 120 mm to 200 mm, more preferred of about 140 mm to 180 mm and most preferred of about 160 mm, especially when the inner diameter (D) of the interior space (15a, 15b) is about 1200 mm, and/or the supply means is inclined by an angle with respect to a horizontal axis and/or a plane of the opening, wherein the angle fulfills the relationship $$\sin\alpha = \frac{y}{d*k}$$

with y being the height of the centrifuge element, d being the inner diameter of the opening and k being a constant in a range of 0.83 to 0.91, more preferred 0.85 to 0.89 and most preferred of about 0.87.

Furthermore it is proposed that the centrifuge element comprises at least one bottom wall, located especially opposite to the opening, and at least one, especially cylindrical, elliptical and/or circular side wall, wherein preferably above the bottom wall at least one, especially at least partly interchangeable, bottom plate may be located and wherein preferably the corner between the bottom wall and/or the bottom plate on the one side and the side wall on the other side is at least partly rounded, especially with a radius, preferably a radius of about 5% to 15%, more preferred 7.5% to 12.5%, most preferred about 10% of the inner diameter of the interior space and/or of about 100 mm to 150 mm, most preferred 120 mm, and/or the cone length, the height of the centrifuge element and the radius fulfill the relationship $$\frac{y-x}{y-r} = k_1,$$

with $k_1$ being 0.3 to 0.5, more preferred 0.35 to 0.45 and most preferred about 0.4, and/or $$\frac{x-r}{y-r} = k_2,$$

with $k_2$ being 0.5 to 0.7, more preferred 0.55 to 0.65 and most preferred about 0.6.

For the before described embodiment it is furthermore proposed that the interchangeable bottom plates have different shapes, and or surface properties, especially different non-sticking properties, comprise different materials, especially having different softness and/or flexibility properties, and/or comprise different apertures for dumping fluids extracted out of the food product by centrifuging.

The inventive device may further be characterized in that the centrifuge element can be further tumbled around a third rotational axis, especially being mainly perpendicular to the first rotational axis, being mainly parallel to the second rotational axis, running at least partly through the interior space, being located between the bottom wall and/or the bottom plate and the opening, preferably about 13 mm, especially when the inner diameter (D) of the interior space (15a, 15b) is about 1200 mm, 2% to 3%, more preferred 2.5% to 3.5%, most preferred about 4% of the height of the centrifuge element and/or 5% to 50%, more preferred 7.5% to 30%, most preferred about 10% of the radius of the corner above the bottom wall and/or the bottom plate, and/or running between the side walls and/or intersecting the first rotational axis, especially to transfer the centrifuge element from the filling position and/or the centrifuging position to the discharging position or vice versa.

An advantageous embodiment may be characterized in that in the area of the bottom wall, the bottom plate, the side wall and/or the corner at least partly a layer of a material being softer than the material of the bottom wall the bottom plate and/or the side wall is located, especially being provided as a cover of the bottom wall, the bottom plate, the side wall and/or the corner.

An inventive device may further be characterized by at least one discharge means, wherein the food product is transferable, especially in the discharging position of the centrifuge element, from the interior space to the discharge means, preferably by tumbling the centrifuge element around the third rotational axis, and/or the food product is conveyable by the discharge means to a food product output of the device.

For the before described embodiment is preferred that by the discharge means the food product transferred from different centrifuge elements is conveyable to one output of the device, wherein preferably the discharge means comprises at least two, preferably a plurality of, collecting means by which the food product is conveyed to the output and/or is conveyed to an intermediate element conveying the food product to the output.

Furthermore it is proposed that at least one air lock device and/or at least one second valve means, especially comprising at least one rotary valve and/or rotary air lock, through which the food product is conveyed to the output, wherein especially the food product is conveyable by the collecting means and/or the intermediate element to the second valve means and/or into the air lock device, preferably through an air lock entrance, and/or the food product is conveyable by at least one air lock conveyance element and/or the second valve means to an air lock exit, especially representing the output of the device, and/or onto a product output device.

Another embodiment of an inventive device may be characterized in that the conveyance means, especially the supply means and/or the dividing element, the fryer conveyance device, the product providing means, the discharge means, the collecting means, the intermediate element, the air lock conveyance element and/or the product output device comprise(s) at least one conveyor belt, at least one conduit, at least one chute, at least one slide, at least one wire mesh belt and/or at least one ramp.

Finally it is proposed for a device that the device is at least partly housed within a casing, especially a pressure tank, in which vacuum conditions may be provided.

With regard to the method this aim is achieved in that the food product is conveyed to and/or from the centrifuge element such that it is transferred to the conveyance means, transferred from one element of the conveyance means to another element of the conveyance means, from the conveyance means to the centrifuge element and/or from the centrifuge element to an output of the device by a sliding movement, with a minimized sliding height and/or with a velocity in the moment of impact at the end of the transfer being below a predefined maximum velocity.

The sliding height is especially in the order of not more than 3 times, more preferably not more than 2 times, most preferred not more than 1.5 times of an average length, especially a maximum elongation, of the food product and/or maximum velocity is $$2 \frac{m}{s},$$

more preferred $$1{,}5 \frac{m}{s}$$

and most preferred $$1{,}2 \frac{m}{s}.$$

Alternatively or additionally the method can be characterized in that the food product is placed by the conveyance means close to a side wall of the centrifuge element and/or a corner of the side wall with a bottom wall and/or a bottom plate, before and/or during the conveyance of the food product to the centrifuge element the conveyance means is at least partly inserted into the interior space and/or during or after the conveyance of the food product to the centrifuge element the conveyance means is at least partly extricated out of the interior space and/or the food product is placed onto an already existing layer of food product within the centrifuge element.

For the method it is further proposed that at least one supply means of the conveyance means is at least partly moved, especially hinged around a second rotational axis into or out of the interior space and/or a length of the supply means is, especially telescopically, altered.

A preferred embodiment of the method can be characterized in that the food product is conveyed by conveyance means, especially the supply means to at least two, preferably a plurality of, centrifuge elements, wherein the food product is conveyed alternatively to one of the centrifuge elements, especially the supply means is alternatively positioned at least partly in one of the centrifuge elements and/or is actuated in reverse directions, and/or the food product is conveyed by at least one dividing element of the conveyance means, especially by reverse direction actuation of the dividing element to at least two, especially a plurality of supply means, wherein via each of the supply means the food product is conveyed to a respective centrifuge element to which the supply means is attributed.

The before described embodiment may be characterized in that the centrifuge element is spun with a first speed around the first rotational axis to extract liquid out of the food product, wherein especially during the food product is conveyed to a first centrifuge element, especially when the supply means is located at least partly within the interior space of the first centrifuge element, at least one second centrifuge element is spun with the first speed around its first rotational axis, preferably with the supply means being located outside the interior space of the second centrifuge element, and/or the second centrifuge element is in or is brought into a discharging position, wherein especially the acceleration to the first speed and/or deceleration from the first speed is controlled to reduce relative movement between the food product and the centrifuge element and/or to reduce relative movement of single pieces of the food product relative to each other.

For the before described embodiment it is further proposed that the conveyance means is positioned within the interior space at least temporarily such that the food product is slided in the corner of the centrifuge element formed between a bottom wall and/or a bottom plate on the one hand and a side wall of the centrifuge element on the other hand and/or that the sliding height (hd,db) of the food product from the conveyance means, especially the supply means, is minimized, and/or that at least temporarily the centrifuge element is rotated with a second speed, being smaller than the first speed, around the first rotational axis, especially that during the filling of the food product into the centrifuge element the centrifuge element is rotated by 360° around the first rotational axis and/or by more than 360° around the first rotational axis, preferably such that the food product is placed onto the already existing layer of food product within the centrifuge element.

Another embodiment of the method may be characterized in that the centrifuge element is hold in or brought into a filling position before and/or when the food product is conveyed to the centrifuge element, is hold in or is brought into a centrifuging position when and/or before the centrifuge element is spun with the first speed and is hold in or brought into a discharging position to discharge the food product out of the centrifuge element, wherein in the filling position and in the centrifuging position an opening of the centrifuge element is oriented upwards and that the centrifuge element is tumbled around a third rotational axis to transfer the centrifuge element from the filling position or centrifuging position into the discharging position or from the discharging position into the filling position or centrifuging position, wherein the second speed, a third speed around the third axis, an acceleration to the second speed and/or to the third speed and/or a deceleration from the second speed and/or from the third speed, a speed of at least one discharge means and/or a speed of the conveyance means is/are controlled such that internal forces within a food product layer are minimized and/or such that a sliding height of the food product is minimized.

For the before described embodiment it is preferred that the food product is discharged especially via the opening of the centrifuge element, to the discharge means and/or the food product is conveyed by the discharge means to the output of the device, wherein especially the food product is conveyed from the centrifuge element to the discharge means, from one element of the discharge means to another element of the discharge means and/or from the discharge means to the output by a sliding movement and/or with a minimized drop height, especially a drop height below 150 mm, more preferred a drop height below 100 mm.

The invention furthermore proposes that the food product is conveyed from different centrifuge elements, especially the first centrifuge element and the second centrifuge element, preferably by the discharge means to the output of the device, wherein especially the discharge means comprises at least two, preferably a plurality of, collecting means by which the food product is conveyed to the output or is conveyed to at least one intermediate element conveying the food product to the output.

Finally an inventive method may be characterized in that the food product is provided as a fried product to the conveyance means via at least one fryer conveyance device and/or as a raw material and/or non-fried material to the conveyance means via at least one product providing means.

Thus the claimed subject-matter is based on the astonishing perception that a method and a device for centrifuging of a food product, especially fried snack food products, with the aim to separate liquid substances from solids under vacuum and/or atmospheric conditions, wherein the food products are sensitive for breakage, can be provided that allows a lower breakage ratio by reducing mechanical impacts on the product during filling, centrifuging, emptying and discharging of the food product into and out of the centrifuge element. According to the invention this reduction of the product impact is achieved by ensuring that the food product is transferred from one element to another element mainly by a sliding movement, at least with reduced dropping heights, especially the dropping height of the product into the centrifuge element, especially a centrifuge basket. In the sense of the invention a sliding movement is distinguished from other movements, especially a dropping, by a velocity of the product in the movement of an impact on the another element. A sliding movement is especially given when the velocity during impact is below $$2 \frac{m}{s},$$

better below $$1{,}5 \frac{m}{s}$$

and at the best below $$1{,}2 \frac{m}{s}.$$

A sliding movement is especially given independent from these criteria or in addition to the before described criteria when the product does not loose contact to the means conveying and/or transferring the product. More precisely this sliding movement and reduction of the sliding height and the velocity during impact is reached in that respective transportation devices, like a conveyance means, are adapted to each other, especially with respect to a transportation speed and/or a relative arrangement to each other. Especially the conveyance means, preferably a feed belt, is movable such that it is at least partly insertable into or extricable out of an interior space of the centrifuge element, especially a centrifuge basket.

Preferably an increased diameter of the centrifuge element in comparison to the ones known in the state of the art allows to insert the conveyance means into the interior space, which makes it possible to fill the centrifuge element without or with reduced dropping and/or sliding heights.

In case the conveyance means is realized by a feed belt the feed belt might be a equipped with a hinged belt part. For sensitive handling of the food product during the distributing into the centrifuge basket the hinged belt part may be lowered into the interior space of the centrifuge element. In such a filling position of the feed belt the position of the end of the feed belt and the angle of the feed belt ensure that the product has a minimized sliding height and slides the product close to a side wall or a corner of the basket. Especially the sliding height and/or dropping height of the product may be minimized below 150 mm. By reducing the sliding height the mechanical impact is reduced. Furthermore by filling the fried product to this part of the basket, during the later spinning of the centrifuge element a relative movement of the food product with respect to the centrifuge element as well as a relative movement of single elements of the food product with respect to each other, especially in a radial direction of the spinning movement, is reduced. To furthermore reduce the mechanical impact and stresses during spinning, especially during an acceleration of the centrifuge element, the centrifuge element is rotated during the filling. The rotation might be such that the centrifuge element makes only one rotation of 360° during the filling to reduce a thickness of the product layer and to soften the sliding. The rotation might alternatively be such that a rotation of more than 360° is carried out during the filling. That means that by the rotation of the centrifuge element it is furthermore reached that following food product items are sliding not the whole distance into the centrifuge element but have a reduced sliding height onto other food product items what furthermore reduces the sliding height for these following food items and thus reduces the risk of breakage. Thus during filling the food product is placed onto an already existing layer of food product within the centrifuge element, or in other words the product might be placed during filling product on product. This allows to reduce the dropping height even more, for example below 100 mm, which further reduces product breakage. For establishment of the product on product layer a bottom plate of the centrifuge element may be mounted such that, at least during filling, the product being directly located on it will stay in its position. By this stapling also the effectiveness of the centrifuging is increased as liquid can leave the food items more easily. After the filling of the centrifuge the hinged belt part will be lifted out of the basket and the centrifuge starts to spin.

Especially by this measure the impact on the food product is reduced by reducing a sliding height of the product entering the centrifuge basket; the position of the product in the corner of the basket leads to a reduction of product movement during spinning, especially the acceleration of the centrifuge basket.

Furthermore before filling the food product into the centrifuge element the food product can be handled, especially transported such that mainly a sliding motion is caused when transferring it from one element of the device to another element. This also decreases the impact on the product, at least reduces a respective sliding height.

By controlling the feed belt angle and also the conveyance speed of the feed belt the impact of the product sliding into the basket can also be controlled and especially minimized, especially by reducing the sliding height and the speed with which the products falls into the basket; and also a carefully lay down of the products during the filling is reached by positioning the food product within the centrifuge element such that it creates a product layer that is similar to the form of the one that is created by centrifuging to create an optimum relation between layer height and the layer thickness to also reduce the stresses onto the food product during the spinning/centrifuging process.

According to the invention the conveyance means is especially not restricted to a feed belt but might also incorporate a slide or chute to transport the product into the centrifuge element. When using a belt it is preferred that the belt is provided with a wire mesh belt. These belts have the tendency to damp an impact when the product drops onto the belt. Due to this "spring" function of the belt the product breakage is further reduced.

To reduce impacts onto the product during the transfer to the conveyance means or from one element of the conveyance means to another the speed of the conveyance means and the elements of the conveyance means are adapted to the speed of a feeding means, like a fryer belt. This allows to locate the elements of the conveyance means or the conveyance means and the feeding means close to each other to allow a sliding movement, at least a reduced sliding height of the food product.

Furthermore it was found that the discharging of the food product into a sluice chamber by using a bottom valve in the centrifuge element and furthermore the discharging of the food product out of the sluice chamber using also another valve also leads to an increased impact onto the food product and thus an increased breakage.

Thus, in addition to the above measures regarding the transport of the food products to the centrifuge element or the filling of the food product into the centrifuge element, which might be realized independently from each other, in addition or alternatively to these measures further provisions can be provided to reduce the breakage ratio of the food product during the discharge of the food product out of the centrifuge element.

This reduction is achieved by tumbling the centrifuge element around a third rotational axis that is especially perpendicular to the first rotational axis when the centrifuge element is spun for centrifuging. This allows especially the centrifuge element to have only one single opening. This single opening is used for filling as well as emptying. Emptying is especially achieved when tumbling the centrifuge element around the third axis. This avoids the necessity of a second opening, especially a bottom valve as known in the state of the art. This rotational axis for tumbling furthermore runs preferably through the interior space of the centrifuge element and allows a discharging of the food product out of the centrifuge element, especially via the opening through which the food products are fed into the centrifuge element on to a discharge means, preferably in form of a collecting belt. Also for discharging the geometry of the centrifuge element and the tumbling speed is adapted to reach a reduced sliding height, especially to avoid a dropping of the food product by sliding the food product. Thus, during filling and spinning/centrifuging the centrifuge element, especially in form of the centrifuge basket, remains in a vertical filling or centrifuging/spinning position, that means that an opening of the centrifuge element is located on the upper side of the centrifuge element. After the centrifuge element has stopped centrifuging the whole centrifuge element tumbles to empty the products onto a transport or collecting belt. Especially by controlling an acceleration and deceleration speed of the centrifuge element during the tumbling movement internal forces in the product layer are reduced and thus an additional product breakage is prevented. Also for sensitive discharge of the products the tumbling speed is controlled. In this way the food product will be collected on a connecting or transport belt underneath the centrifuge element.

Due to the position of the rotational axis for the tumbling also the sliding height of the food product during this discharging is minimized. This is furthermore supported by the fact that an opening of the centrifuge element might by cone shaped as explained later.

Especially this cone shape opening allows to ensure a sliding motion of the food product within and out of the centrifuge element instead of a dropping out of the centrifuge element. Especially by the tumbling of the centrifuge element in comparison to the opening of a bottom valve the mechanical impact onto the food product is minimized as already mentioned above.

Surprisingly it has been found that no additional space within the room in which the centrifuge element is located, especially a vacuum tank is, needed in comparison to the state of the art devices. Especially by adapting the geometry of the centrifuge element and the location of the rotational axis for the tumbling as well as the by the respective cross sectional shape of the centrifuge element the needed space can be minimized by simultaneously minimizing a distance between the centrifuge element, especially the opening, and the discharge means.

The reduction of an impact on the food product during the filling into the centrifuge element as well as during the discharge of the food product out of the centrifuge element is, as already mentioned, furthermore supported by the form of the centrifuge element. Especially the centrifuge element has round corners and a reduced opening diameter, especially a cone shaped opening, to prevent uncontrolled discharge of the product. Due to the form of the centrifuge element and/or its tumbling around the third rotational axis dropping heights onto the conveyance means, especially the discharging means, can be reduced below 100 mm. This further reduces product breakage. Especially by the conical opening the discharge speed and sliding height of the product onto the discharging means, like the collecting belts, can be controlled and minimized. Furthermore by providing a bottom plate of the centrifuge element that might be replaceable and/or might be made of a softer material in comparison to the remaining parts of the centrifuge element, the mechanical impact onto the food product during filling and discharging might also be reduced. Especially, the bottom plate can be replaced by a bottom plate with different shapes, and different softness properties or non-sticking properties materials.

By providing respective openings within the bottom plate and by providing a space beneath the bottom plate fluid which is leaving the product during spinning can be collected in the centrifuge element housing and will be distributed back into the frying process, however the centrifuge element is designed in such a way that during tumbling for the discharge the oil remains in the space.

Further, by providing respective geometric forms of the centrifuge element, especially round corners, the pressure in the product layer can be reduced during spinning. This pressure is additionally reducible by means of soft materials comprised by or located on the bottom plate.

Furthermore not only by the filling and discharging of the food product into or out of the centrifuge element the risk of a product breakage might by reduced. To especially reduce sliding heights of the food products onto or from the conveyance means respective measures can be taken. For example a feed belt of the conveyance means, that conveys the products to the centrifuge element may be positioned directly underneath a discharge of a fryer to reduce transfer times between frying process and centrifuging but also to allow, as explained above, a sliding motion of the food product in comparison to a dropping. Thus by adapting the position of the conveyance means, sliding height and the speed of the belt the likelihood of breakage might also be reduced. Furthermore the speed of the discharge means, especially of a collecting belt or intermediate belt after discharging the food product out of the centrifuge element can be controlled to ensure a sliding motion of the food product, at least to lower sliding heights during emptying of the centrifugal element.

Usually after emptying the centrifugal element the food product is distributed to an intermediate buffer, especially in form of the intermediate or a buffer belt. From the intermediate vacuum buffer belt the product is than distributed on to product discharge locks (sluices). In the sluice conditions might be revealed and the product will be distributed out of the sluices. Also by adapting the speed and geometry of the buffer as well as the sluices drop heights can be minimized and thus the likelihood of breakage can be reduced.

In a preferred embodiment the food product is collected on the conveyance means, than distributed by choosing a direction of travel of the conveyance means or by using respective separate supplying means to which the conveyance means conveys the food product, to allow the installation of parallel centrifuge elements, for example two parallel centrifuge elements. In this configuration it is especially proposed that always one centrifuge element is in its filling position while the other centrifuge element spins/centrifuges. The filling of the centrifuge element stops after the second centrifuge is back in its filling position and then the feeding direction conveyance means might be switched into an opposite direction to start filling of the other centrifuge element. This process allows to adapt the filling degree of the food product in the centrifuge elements to an optimum value such that the mechanical internal stresses within the food product are minimized further reducing the breakage ratio.

Further measures to reduce the breakage can also be taken, for example the tumbling speed and tumbling acceleration might be controlled to prevent additional product breakage by ensured sliding of the product during tumbling and discharge on the discharge means. The actuator of the centrifuge element, especially to accomplish a rotation around the first rotational axis, is preferably equipped with an application controller to control a (slower) startup, especially at a speed lower than the first speed, of the centrifuge element and a (slower) stop of the centrifuge. By this abrupt starts and stops are eliminated and product breakage as a result of the mechanical impact due to relative movement of the product and the centrifuge is reduced. Also the acceleration and deceleration of the centrifuge element for spinning can be controlled beside the filling degree to reduce internal forces in the food product layer which might result in additional breakage. When filling the centrifuge element also a predefined orientation of the food product can be reached by a control of the movement of the centrifuge element as well as the part of the conveyance means that is inserted into the interior space of the centrifuge element.

Especially during the filling the centrifuge element a rotational speed of the centrifuge element can be controlled such that by one turn of the centrifuge element a sliding of the food product can be softened and a product impact can be reduced by making use of an already existing product layer within the centrifuge element.

Also the spinning speed during centrifuging can be controlled to adjust the applied speed forces to optimize the centrifuging process, that means to optimize a force for maximum extraction of liquid out of the food product and to simultaneously minimize a breakage of the food product.

In addition to the measures, described above, the environment, in which centrifuging is carried out can further be controlled, especially by controlling the environmental temperature and humidity, to reduce a breakage ratio. For example, steam, saturated or supper heated, may be injected into the centrifuge element or a heating device like a infrared heater might be positioned in the centrifuge element.

Also it might be an advantage to tumble the centrifuge element by 360° to discharge the food product to optimize the discharge process especially to reduce the time during which the centrifuge is not spinning or not filled.

In preferred embodiments the product discharge lock (sluice) can be replaced by an airlock to discharge the product out of the device. As this allows the use of transportation elements like additional belts to convey the food product to the output may be used also reducing the risk of breakage.

When belts or slides are used to transport the food product different belt types or conveyances types may be used for example to adapt a belt or slide material to specifications of the food product, for example soft materials may be used to reduce mechanical impacts.

Further details of the invention will be described in the following specification in which examples of the invention are explained with the help of figures, in which FIG. 1 is a schematic view onto a device according to the invention;

Figure 1:
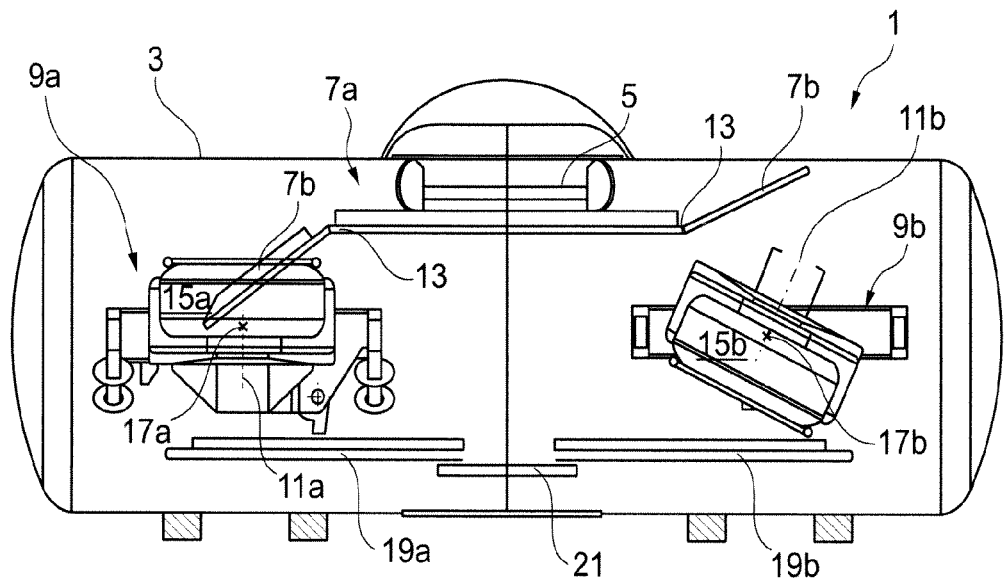
Figure 4:
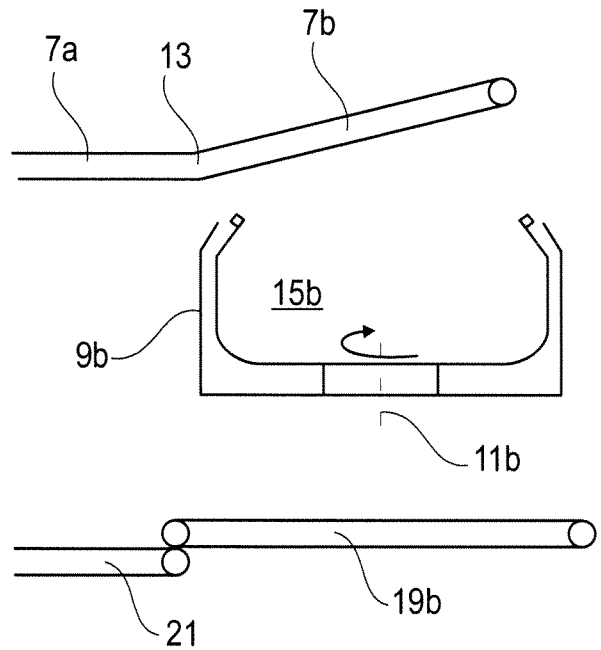
Figure 5A:
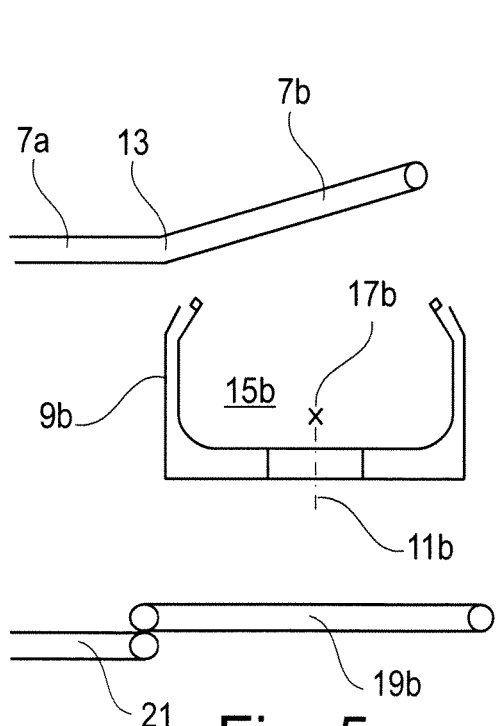
Figure 5B:
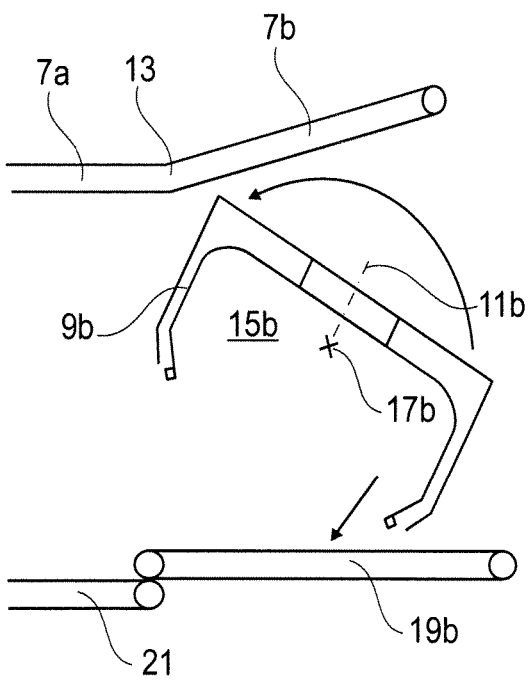
Figure 5C:
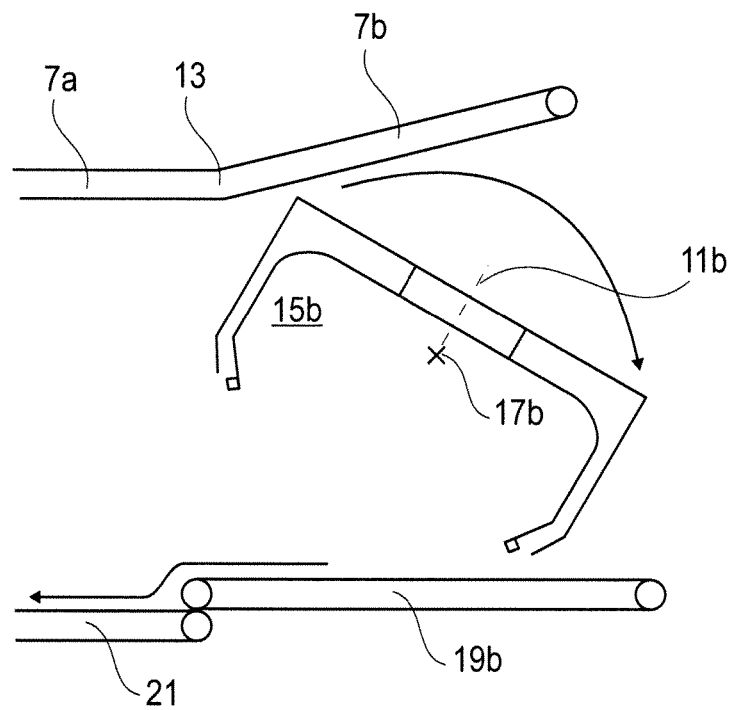
Figure 6:
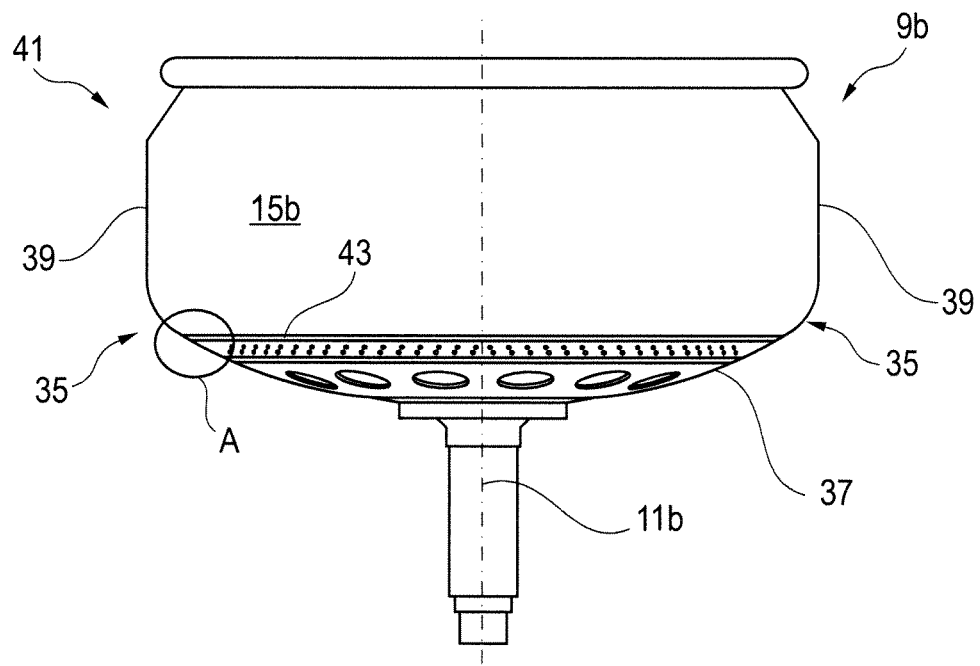
Figure 7:
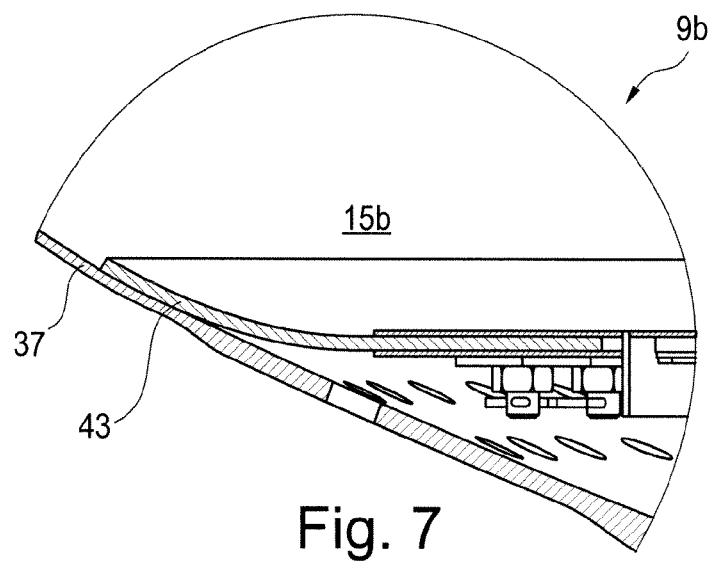
Figure 8A:
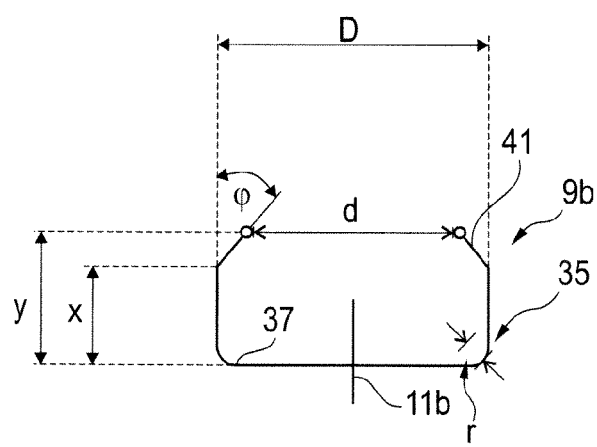
Figure 8B:
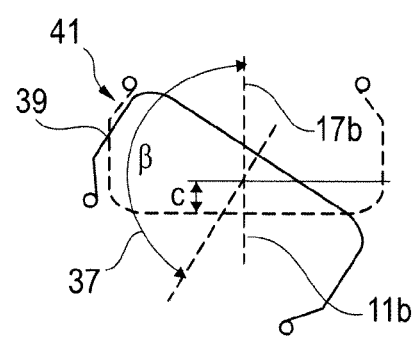
Figure 9A:
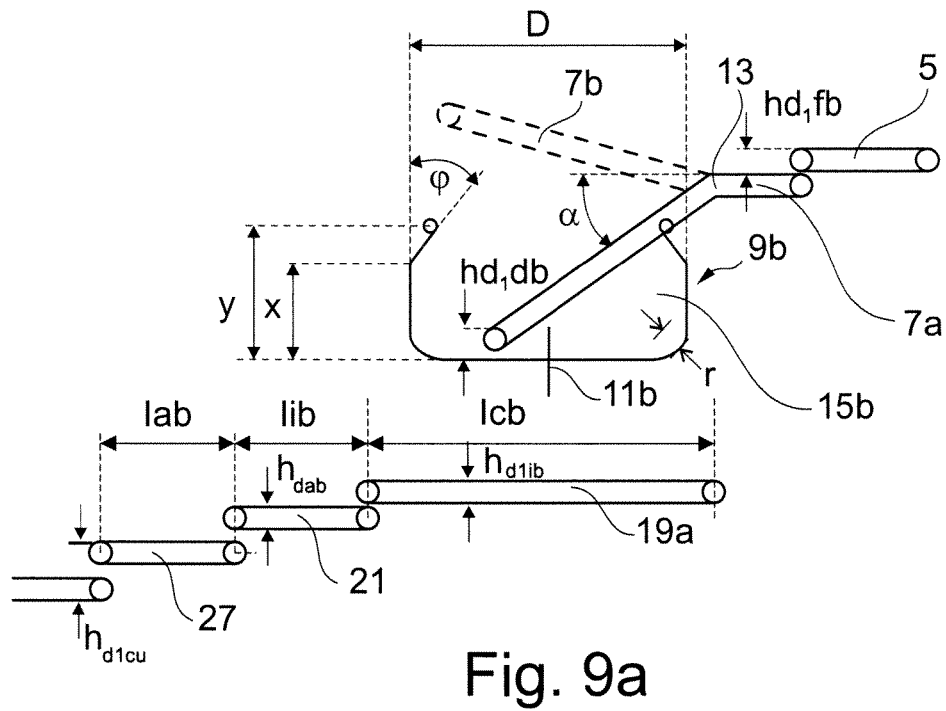
Figure 9B:
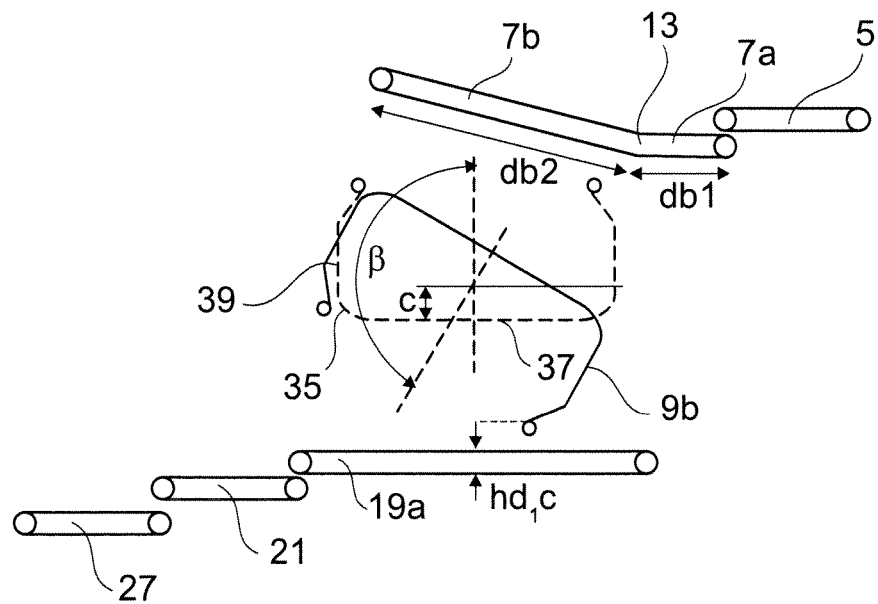

FIGS. 3a, 3b, 3c, and 3d are schematic views onto a part of the device showing different positions of the device during a filling of the centrifuge element;

FIG. 4 is a perspective view onto a part of the device similar to FIGS. 3a to 3d during a spinning of the food product;

FIGS. 5a, 5b, and 5c are views onto the centrifuge element in different positions of the centrifuge element during a discharging of the food products out of the centrifuges element;

FIG. 6 is a perspective view onto the centrifuge element of the device of FIGS. 1 to 5c in form of a centrifuge basket;

FIG. 7 is a detailed view onto the cutout A in FIG. 6;

FIGS. 8a to 8b are schematic views onto the centrifuge element showing different geometrical dimensions of the same; and FIGS. 9a and 9b are schematic views onto the different elements of the device showing respective geometrical dimensions;

FIG. 1 shows a view onto a centrifuge device 1 according to the invention. As shown in FIG. 1 the centrifuge device 1 comprises a casing in form of a pressure tank 3. Within the pressure tank 3 vacuum conditions can be established, especially a pressure below atmospheric pressure up to 10 mbar, preferably in a range of 20 to 200 mbar may be generated. Into the pressure tank 3 a fryer conveyance device in form of a fryer belt 5 is reaching. As explained later in alternative embodiments the food product might be provided as a fried product but also in form of a non-fried and/or raw material by other devices, like a product providing means and/or a rotary valve.

The fryer belt 5 conveys food products, that have undergone a frying step before, to the centrifuge device 1. The centrifuge device 1 furthermore comprises a conveyance means in form of a dividing belt 7. As explained later the dividing belt 7 is separated in different sections wherein a section 7a fulfills the function of a dividing element whereas the sections 7b represent respective supply means. By reverse actuation of the dividing belt 7 the food products provided by the fryer belt 5 can be conveyed to respective centrifuge elements in form of centrifuge baskets 9a and 9b.

As explained also later, the centrifuge baskets 9a, 9b may be spun around respective first rotational axis 11a and 11b respectively. By spinning the centrifuge baskets 9a and 9b an amount of liquid, especially fat or water, contained in or located on a surface of the food product is reduced by separating the liquid and the solid components of the food product. As also explained later the dividing belt 7 is constructed such that the supply means 7b can be hinged around a second rotational axis 13 relative to the dividing element 7a to allow to insert and to extricate the supply means 7b into and out of the interior spaces 15a, 15b of the centrifuge baskets 9a and 9b. Furthermore it is shown in FIG. 1 that the centrifuge baskets 9a and 9b can furthermore be tumbled around a third rotational axis 17a, 17b. As shown for centrifuge basket 9b the centrifuge basket 9b can be tumbled around the third rotational axis 17a, 17b to allow a discharging of food products out of the centrifuge basket 9b onto a discharge means, more precisely a collecting means of the discharge means, in form of a collecting belt 19b. Via the collecting belts 19a, 19b food products can be conveyed from the centrifuge elements to a food product output or intermediate element in form of an intermediate belt 21.

Figure 2A:
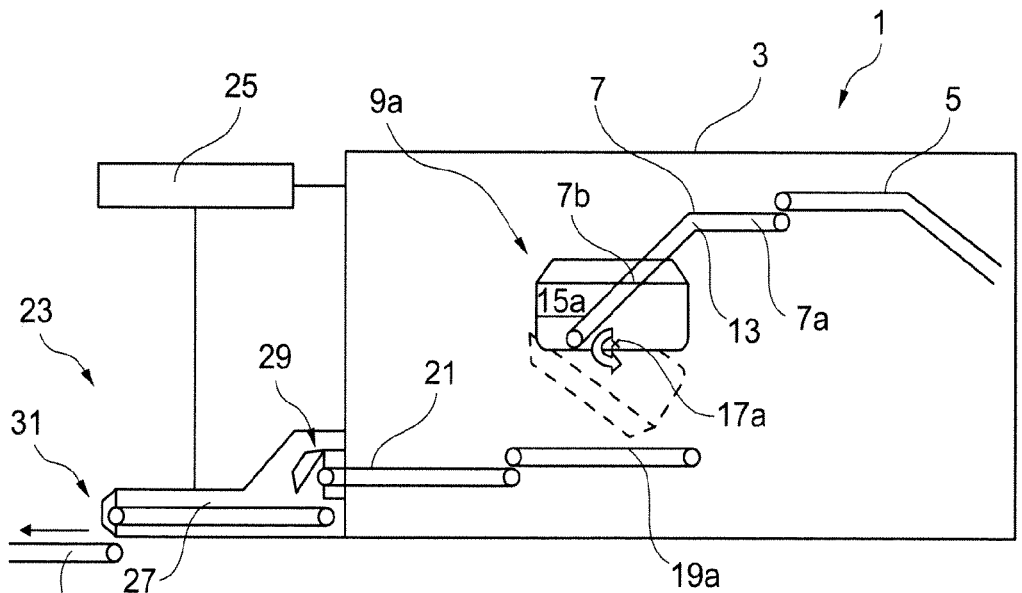
FIG. 2a is a another view onto the device of FIG. 1 furthermore showing an airlock device for discharging food products.

In FIG. 2a the respective components of the centrifuge device 1 are shown from a different perspective. As can be taken from FIG. 2a the centrifuge device 1 is connected via the intermediate belt 21 to an airlock 23. Both, the airlock 23 and the pressure tank 3, are connected to a vacuum system 25 to establish vacuum conditions within the airlock 23 and the pressure tank 3. Within the airlock 23 a further air lock conveyance element in form of an airlock belt 27 is located. The food product is conveyed via the intermediate belt 21 through an air lock entrance in form of an opening 29 onto the airlock belt 27 and, after closing the opening 29, another opening 31 of the airlock 23 representing an air lock exit is opened to discharge the food product from the airlock belt 27 onto a product output belt 33.

Thus the centrifuge device 1 allows to fill respective centrifuge elements 9a, 9b with a food product, to centrifuge the food product and to discharge it out of the centrifuge elements 9a, 9b to an output of the device 3.

Figure 2B:
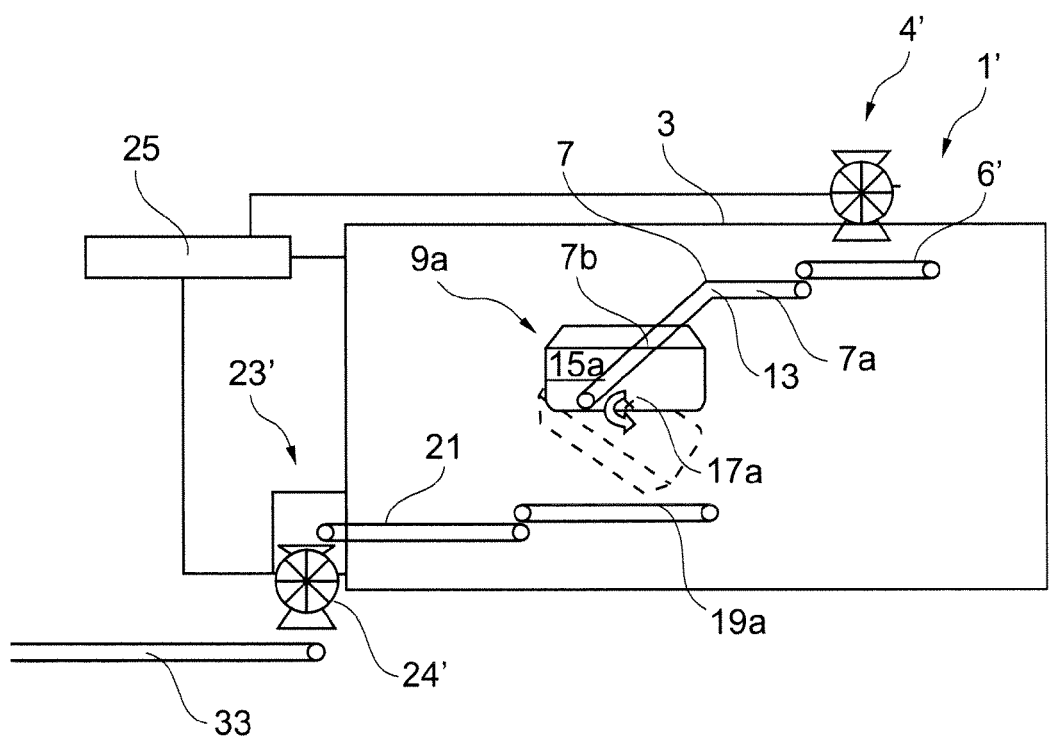
FIG. 2b is a view comparable to the one shown in FIG. 2a onto an alternative device comprising respective rotary air lock devices.

In FIG. 2b another centrifuge device 1' according to the invention is shown in a perspective view comparable to FIG. 2a. The components of centrifuge device 1' that are identical to the ones of centrifuge device 1 have the same reference numbers. The centrifuge device 1' differs from the centrifuge device 1 by different product infeeds and discharges. The food product is provided to the dividing belt 7, especially dividing element 7a, via a feed means in form of a feed belt 6'. From outside the pressure tank 3 the food product is provided to the feed belt 6' via a first valve means in form of a rotary air lock comprising a rotary valve 4' being connected to the vacuum system 25. The first valve means 4' allows to provide the food product to the centrifuge device 1' irrespective of the location of a pre-treatment device, like a fryer. Via the first valve means 4' all kinds of food products, fried products, pre-fried products but also raw food products, may be provided. In line with the invention the position of the first valve means 4' is chosen such that the food product is transferred to the feed belt 6' by a sliding motion.

In contrast to the centrifuge device 1, centrifuge device 1' furthermore comprises a different air lock 23' at the discharge side of the centrifuge device 1'. The air lock 23' is also formed in form a rotary air lock comprising a rotary valve 24'. Also the rotary valve 24' is connected to the vacuum system 25 and furthermore the rotary valve 24' is located with respect to the intermediate belt 21 as well as the product output belt 33 such that the sliding heights are chosen so that the food product is not dropping but sliding form the intermediate belt 21 into the rotary valve 24' and also slides out of the rotary valve 24' onto the product output belt 33.

In the following, the respective steps of the centrifuging carried out by centrifuge device 1 or 1' are described with the help of FIGS. 3a to 5c, especially with the help of FIGS. 3a to 3b the filling of the centrifuge element is explained, with the help of FIG. 4 the centrifuging is explained and with the help of figures of 5a to 5c the discharge of the food product out of the centrifuge element 9b is explained.

In FIG. 3a the centrifuge device 1 is shown in the starting position of the centrifuge element 9b. The centrifuge element 9b is in a filling position and the supply means 7b is located outside the interior space 15b of the centrifuge basket 9b. By hinging the supply means 7b around the rotational axis 13 the supply means 7b is brought into the position shown in FIG. 3b. In this position the supply means 7b is at least partly located within the interior space 15b. This leads to the effect that food products that are provided by the fryer belt 5 are directly conveyed via the dividing belt 7 to the centrifuge element 9b, thus reducing a transfer time between the fry process and the centrifuging process. By bringing the supply means into the position shown in FIG. 3b, by a respective rotation of the supply means 7b relative to the dividing element 7a and also relative to the centrifuge basket 9b the food product is conveyed into the centrifuge basket 9b such that only a minimum sliding height for the food product is existing. The food product is especially not dropping but only sliding into the centrifuge basket 9b. Furthermore, the food product is positioned in a corner 35 of the centrifuge basket 9b formed between a bottom wall 37 and a side wall 39, especially close to the side wall 39. Thus a later movement of the food product in radial direction of axis 11b is minimized to avoid impacts onto the product that might lead to a breakage.

During the conveying of food products into the centrifuge basket 9b the centrifuge basket 9b is turned around the first rotational axis 11b such that the centrifuge basket 9b makes one rotation of 360°. It is also possible to move the supply means 7b around the rotational axis 13 to lift it at least a small amount out of the interior space 15b to allow that additional food products slide onto an existing product layer to soften the sliding.

The product distribution into the centrifuge basket 9b by rotating the same around the first rotational axis is shown in FIG. 3c by respective arrows. After filling the centrifuge basket 9b, especially in a way that a product layer is produced that is similar to the one created by centrifuge forces, to reduce internal stresses in the food product the supply means 7b is lifted out of the interior space 15b as shown in FIG. 3d. This lifting especially takes place after a direction of movement of the dividing belt, especially the dividing element 7a and/or the supply means 7b, has been reversed.

As shown in FIG. 4 by a respective arrow around axis 11b the centrifuge basket 9b is spun around the first rotational axis 11b when the supply means 7b is in a position outside the interior space 15b. By spinning/centrifuging the food product, the liquid or fat located on the product will be separated and thus their content on the food product is reduced.

After the centrifuging of the food product the food product is discharged out of the centrifuge basket 9b as shown in FIGS. 5a to 5c.

By tumbling the centrifuge basket 9b around a third rotational axis 17b the food product slides onto the collecting belt 19b. As the third rotational axis 17b is located within the interior space 15b a minimum space for the tumbling of the centrifuge basket 9b is necessary. Further by the cone shape from of the basket opening the edge of the opening is located close to the collecting belt 19b allowing a sliding instead of a dropping of the food product onto the collecting belt 19b. As shown in FIG. 5b the food product is than conveyed via the collecting belt 19b onto an intermediate belt 21 and after discharging of the food product the centrifuge basket 9b is returned into the filling position as shown in FIG. 5c.

Also by this ratio it is possible to fill in the food product such that the generated product layer is very similar to the layer formed during centrifuging thus leading to reduced stresses within the product layer.

To additionally reduce the impact on the food product when the food product is filled into the centrifuge element or is discharged out of the centrifuge element, the centrifuge elements have respective geometrical properties. These properties are now explained with the help of FIGS. 6 to 8b.

As shown in FIG. 6 the centrifuge basket 9b comprises a corner 35 that connects a bottom wall 37 and a side wall 39. As the corner 35 is rounded, during a centrifuge rotation of the centrifuge basket stresses onto the food product are avoided. As furthermore shown in FIG. 6 the side wall 39 extends into a cone shaped opening 41 of the centrifuge basket 9b.

As especially shown in FIG. 7 on the bottom wall 37 a bottom plate 43 made of a soft material is positioned. A flexible connection of the bottom plate to the bottom wall 37 of the centrifuge basket 9b is provided. The soft material ensures that the impact on the food product is additionally reduced when the food product is falling into the centrifuge basket 9b and the flexible connection reduces the transfer of thrusts onto the food product for example due to an imbalance of the centrifuge element. Also it can be seen that in the bottom wall 37 respective openings are formed that allow that the separated liquid is fed back, for example fat goes back into a fryer. However, when tumbling around the third axis of the centrifuge basket 9b, it is secured that the extracted liquid will not flow back into the interior space 15b what may lead to an unwanted moisten of the food product by the liquid flowing back onto the surface of the food product. This is reached by predefined positioning of respective openings in the bottom wall, especially close to the axis 11b but not close to the side wall 39.

In FIGS. 8a and 8b respective geometrical dimensions of a basket 9b are shown. It was found that by the following geometrical dimensions, especially special relationships between the geometrical dimensions, the sliding motion of the food product can be achieved. The food basket 9b might have a diameter D of about 1200 mm, a height of the side wall x of 350 mm and a total height y of 510 mm. The corner 35 might have a radius r of 120 mm. This radius of the corner has been found to allow the most smooth handling/motion of the food product during filling and discharging of the centrifuge element, especially allowing a sliding motion. This radius has furthermore be found to be a good fit for any food product, especially any geometry and geometric dimensions of food product, and also any size of the centrifuge element, especially inner diameter of an interior space of the centrifuge element. However the ratio of the height of the side wall of 350 mm and the radius r of 120 mm of about ⅓ has been found to lead to a best reduction of stresses in the food product during centrifuging, especially with a inner diameter D of 1200 mm.

It was especially found that for a gentle handling of the food product, especially by assuring a sliding of the food product, the relationship between the height x, the height y and the radius should be chosen such that the ratio $$\frac{x-r}{y-r}$$

should be in a range of 50% to 70%, more preferably 55% to 65% and most preferred about 60% and/or the ratio $$\frac{y-x}{y-r}$$

should be in the range of about 30% to 50%, more preferred 35% to 45% and most preferred about 40%.

The angle φ of the cone shape opening 41 might be 33.5°. As shown in FIG. 8b when discharging the food product out of the centrifuge basket 9b the centrifuge basket is rotated around the third axis that is located in a distance c of 13 mm from the bottom wall 37. It was found that for a smooth discharging of the product, especially to reduce a distance between the centrifuge basket 9b and the collecting belt 19b to reach a sliding motion of the food product and to limit the velocity when the product touches the collecting belt 19b, the geometry of the corners of the basket should be chosen such that the inner diameter d of the opening 41 is preferably in a range of 70% to 90% of the diameter D, more preferred in a range of 75% to 85% of D and most preferred about 80%, so that the angle φ, that fulfills the relationship $$\tan\varphi = \frac{(y-x)}{\frac{1}{2}(D-d)},$$

allows to rotate the basket around the axis being located in a distance c of 5% to 50% of r, preferred 7.5% to 30% of r and most preferred about 10% of r, without a contact between the basket 9b, especially the corners of basket 9b, with the collecting belt 19b.

For the same reason to avoid a contact between the basket 9b and the collecting belt 19b it is preferred that the radius r is about 5% to 15% of the diameter D, more preferred 7.5% to 12.5% of the diameter D and most preferred about 10% of D.

The combination of the height y of the basket, the cone shape angle φ, the side wall height x and the position of the third rotational axis, especially the distance from the bottom wall, allows that an edge of the opening 41 is located very close to the collecting belt 19b such that the food product slides out the interior space 15b onto the collecting belt 19b with a limited velocity when the centrifuge basket 9b is in its discharging position. For a discharge of the food product the centrifuge basket might be rotated around the third rotational axis 17b by an angle β of between 150° to 180°, preferably 155°. It is also possible that the centrifuge basket 9b is than rotated by a total of 360° back into the filling position.

When spinning the centrifuge basket 9b around the fest axis 11b a force of 35 g to 100 g, preferably 60 g, is generated, depending on the product properties. When discharging the food product out of the centrifuge basket the centrifuge basket might be tumbled with a speed of 0.21 radiant pro second around the angle β.

In such a centrifuge a total batch weight input of 8 kg to 18 kg, especially 10 kg can be processed leading to filling degree of the centrifuge basket of between 4% to 9%. Examples for food products might be vacuum dried potato sticks having a product cut size of 8.7 mm×8.7 mm and with a product a length of between 40 to 85 mm. The input moisture content enclosed within the food product might be between 0.8 and 1.2% of weight and might have a total fat content enclosed within the food product and located on the food product surface of about between 58% and 62% of weight before centrifuging, for example a fat content of 60%. Depending on the frying process the temperature of the food product might be in the range of 100° C. to 130° C. ° most likely 120° C.

After centrifuging the food product might have a fat content of 35 to 45%, especially 40% of fat. This value may especially be achieved when a working pressure of 30 to 50 mbar especially 30 mbar is existing within the pressure tank 3.

For conveying the food product into the centrifuge basket the dividing belt having a length of $l_{db1}$ for the dividing element and a length of $l_{db2}$ for the supply means might run with a speed of about 0.035 to 0.07 m/s, especially 0.05 m/s whereas the centrifuge basket is turned with a speed of 0.9 to 0.46, especially 0.5 rpm during the filling of the food product into the centrifuge basket.

Preferably the angle of the supply means to relative to a horizontal direction is between 30° and 40°, for example 36° during filling process. This infeed angle is especially shown as a in FIG. 9a and secures that the food product slides and not drops into the centrifuge basket 9b. It has been found that this sliding motion may be reached when the angle α fulfills the relationship $$\sin\alpha = \frac{y}{d*k}$$

with the constant k being in the range of 0.82 to 0.91 more preferred 0.85 to 0.89 and most preferred about 0.87.

Furthermore, in FIGS. 9a and 9b examples for the slide heights are shown. The sliding height $h_{d,fb}$ from the fryer belt 5 to the dividing belt 7a might be for example 100 mm whereas the next sliding height $h_{d,db}$ from the diving belt, especially the supply means 7b, into the centrifuge basket might be 150 mm.

After centrifuging and tumbling of the centrifuge basket 9b around axis 17b the food product has to slide a sliding height $h_{d,c}$ from the centrifuge basket 9b to the connecting belt of 120 mm, whereas the sliding height $h_{d,ib}$ from the collection belt 19a to the intermediate belt 21 might be 80 mm. In the airlock 23 the food product overcomes than sliding a height $h_{d,ab}$ from the intermediate belt to the airlock belt 27 or the rotary valve 24' of centrifuge device 1' (not shown in FIG. 9a) that might be 135 mm whereas the maximum sliding height $h_{d,cu}$ from the air lock belt 27 or the rotary valve 24' to the product output belt 33 extending to a customer distribution is about 150 mm. By these geometrical dimensions in combination with respective lengths $l_{ab}$ of the airlock belt, $l_{ib}$ of the intermediate belt and $l_{ab}$ of the collecting belt, it is secured that the food product does not drop but slides from one element of the centrifuge device to another element, especially the velocity of an impact on the another element is below a maximum velocity so that a total survival index of 91.5% could be reached in comparison to a survival index of about 54.9% in the state of the art system. This is especially achieved by choosing the sliding heights in the order of the length of the food product being about 85 mm.

In said state of the art systems the food product has to overcome drop heights that correspond to the respective sliding heights of for example $h_{d,fb}$ of 150 mm, $h_{d,db}$ of 500 mm, $h_{d,c}$ of 500 mm, $h_{d,cb}$ of 900 mm and $h_{d,cu}$ of 350 mm. As these heights are more than 4 orders higher than a length of the food product of about 85 mm such distances lead to a dropping of the food product causing severe impacts onto the food product that result in a high breakage, as more height will result in a higher velocity of the product in the moment of impact. Due to the before described dimensions the velocities in state of the art systems are more than 4 times higher.

The breakage ratio is furthermore decreased by the provision that during the centrifuging the centrifuge element is accelerated for 5 to 10 seconds, especially 20 seconds, hold at the maximum speed for about 10 to 30 seconds, especially 20 seconds and finally decelerated over a time of 10 to 20 seconds, especially 20 seconds.

The features disclosed and described in the claims, the specification and the figures might be essential for the claimed invention in the respective embodiments, both when taken separately or when taken in combination with each other.

REFERENCE SIGN LIST 1, 1' centrifuge device
3 pressure tank
4' rotary valve
5 fryer belt
6' feed belt
7 dividing belt
7a dividing element
7b supply means
9a, 9b centrifuge basket
11a, 11b rotational axis
13 rotational axis
15a, 15b interior space
17a, 17b rotational axis
19a, 19b collecting belt
21 intermediate belt
23, 23' air lock
24' rotary valve
25 vacuum system
27 air lock belt
29 opening
31 opening
33 product output belt
35 corner
37 bottom wall
39 side wall
41 opening
43 bottom plate
A cutout
D diameter
d inner diameter
x height
y height
y–x cone length α infeed angle
φ cone angle
β tumbling angle
c distance
$l_{ab}, l_{ib}, l_{cb}, l_{db1}, l_{db2}$ length
$h_{d,ab}, h_{d,ib}, h_{d,db}, h_{d,fb}, h_{d,c}$ slide height
$k_1, k_2, k_3$ constant

The invention claimed is:

1. A device for centrifuging at least one food product provided to the device via a feeding means, the device comprising:
    at least one conveyance means; and
    at least one centrifuge element having an interior space to receive the food product and being adapted to be spun around a first rotational axis,
    wherein the food product is conveyable into the internal space via the conveyance means, the conveyance means comprising a dividing element and at least one supply means, wherein the food product is conveyed to the supply means via the dividing element, and via the supply means to the centrifuge element and wherein further the conveyance means is at least partly insertable into and extricable out of the interior space such that the supply means is at least partly positionable within the interior space by at least partly moving the supply means; and
    wherein the supply means is turnable with respect to the dividing element around a horizontal second rotational axis such that the supply means may be lowered into and lifted out of the interior space.

2. The device according to claim 1, wherein a length of the supply means is alterable.

3. The device according to claim 1, further comprising at least two centrifuge elements, wherein the food product is conveyable alternatively to one of the centrifuge elements.

4. The device according to claim 1, wherein the at least one dividing element to alternatively conveys the food product to at least two supply means, wherein via each of the supply means the food product is conveyable to a respective centrifuge element to which the supply means is attributed.

5. The device according to claim 4, wherein the supply means and the dividing element are at least partly one-piece.

6. The device according to claim 1, wherein the second rotational axis is perpendicular to the first rotational axis and/or the supply means is turnable via a hinged connection.

7. The device according to claim 1, wherein the feeding means comprises at least one fryer conveyance device, at least one product providing means, and/or a first valve means for providing the food product to the conveyance means, and/or the food product is provided to the conveyance means.

8. The device according to claim 1, wherein the centrifuge element comprises at least one opening through which the food product is conveyed into and/or conveyed out of the centrifuge element.

9. The device according to claim 8, wherein the opening has an inner diameter (d), being smaller than the maximum inner diameter of the interior space, and/or has at least partly a conical cross sectional shape.

10. The device according to claim 1, wherein the centrifuge element comprises at least one bottom wall and at least one side wall.

11. The device according to claim 10, wherein the interchangeable bottom plates have different shapes, and/or surface properties, different non-sticking properties, comprise different materials, has different softness and/or flexibility properties, and/or comprise different apertures for dumping fluids extracted out of the food product by centrifuging.

12. The device according to claim 1, wherein the centrifuge element can be further tumbled around a third rotational axis to transfer the centrifuge element from the filling position and/or the centrifuging position to the discharging position or vice versa, and/or in that in the area of the bottom wall, the bottom plate, the side wall and/or the corner at least partly a layer of a material being softer than the material of the bottom wall the bottom plate and/or the side wall is located.

13. The device according to claim 1, further comprising at least one discharge means, wherein the food product is transferrable, in the discharging position of the centrifuge element, from the interior space to the discharge means, by tumbling the centrifuge element around the third rotational axis, and/or the food product is conveyable by the discharge means to a food product output of the device.

14. The device according to claim 1, further comprising at least one air lock device and/or at least one second valve means through which the food product is conveyed to the output.

15. The device according to claim 1, wherein the conveyance means, the supply means, the dividing element, the fryer conveyance device, the product providing means, the discharge means, the collecting means, the intermediate element, the air lock conveyance element and/or the product output device comprise(s) at least one conveyor belt, at least one conduit, at least one chute, at least one slide, at least one wire mesh belt and/or at least one ramp.

16. The device according to claim 1, wherein the device is at least partly housed within a casing, and/or a pressure tank, in which vacuum conditions may be provided.

17. A method for centrifuging at least one food product, wherein the food product provided via a feeding means and a dividing element is conveyed to at least one centrifuge element, having an interior space to receive the food product and being adapted to be spun around a first rotational axis, by at least one conveyance means, and wherein before and/or during the conveyance of the food product to the centrifuge element the conveyance means is at least partly inserted into the interior space such that at least one supply means of the conveyance means is at least partly moved into or out of the interior space and wherein the supply means is hinged around a horizontal second rotational axis relative to the dividing element such that the supply means may be lowered into and lifted out of the interior space.

18. The method according to claim 17, wherein during or after the conveyance of the food product to the centrifuge element the conveyance means is at least partly extricated out of the interior space and/or the food product is placed onto an already existing layer of food product within the centrifuge element.

19. The method according to claim 17, wherein the food product is conveyed to and/or from the centrifuge element such that it is transferred to the conveyance means, transferred from one element of the conveyance means to another element of the conveyance means, from the conveyance means to the centrifuge element and/or from the centrifuge element to an output of the device by a sliding movement and/or with a minimized sliding height and/or with a velocity in the moment of impact at the end of the transfer being below a predefined maximum velocity.

20. The method according to claim 17, wherein the food product is placed by the conveyance means close to a side wall of the centrifuge element and/or a corner of the side wall with a bottom wall and/or a bottom plate.

21. The method according to claim 17, wherein a length of the supply means is altered and/or in that the food product is conveyed by conveyance means, and/or the supply means to at least two centrifuge elements, wherein the food product is conveyed alternatively to one of the centrifuge elements, the supply means is alternatively positioned at least partly in one of the centrifuge elements and/or is actuated in reverse directions, and/or the food product is conveyed by at least one dividing element of the conveyance means to at least two supply means, wherein via each of the supply means the food product is conveyed to a respective centrifuge element to which the supply means is attributed.

22. The method according to claim 17, wherein the centrifuge element is spun with a first speed around the first rotational axis to extract liquid out of the food product.

23. The method according to claim 17, wherein the conveyance means is positioned within the interior space at least temporarily such that the food product is slid in the corner of the centrifuge element formed between a bottom wall and/or a bottom plate on the one hand and a side wall of the centrifuge element on the other hand and/or that the sliding height ($h_{d,db}$) of the food product from the conveyance means is reduced below 150 mm.

24. The method according to claim 17, wherein at least temporarily the centrifuge element is rotated with a second speed, being smaller than the first speed, around the first rotational axis, and wherein during the filling of the food product into the centrifuge element the centrifuge element is rotated by 360° around the first rotational axis and/or by more than 360° around the first rotational axis.

25. The method according to claim 17, wherein the centrifuge element is held in a filling position before or brought into a filling position before and/or when the food product is conveyed to the centrifuge element, is held in a centrifuging position when or is brought into a centrifuging position when and/or before the centrifuge element is spun with the first speed and is held in a discharging position to discharge the food product out of the centrifuge element or brought into a discharging position to discharge the food product out of the centrifuge element, wherein in the filling position and in the centrifuging position an opening of the centrifuge element is oriented upwards and that the centrifuge element is tumbled around a third rotational axis to transfer the centrifuge element from the filling position or centrifuging position into the discharging position or from the discharging position into the filling position or centrifuging position, wherein the second speed, a third speed around the third axis, an acceleration to the second speed and/or to the third speed and/or a deceleration from the second speed and/or from the third speed, a speed of at least one discharge means and/or a speed of the conveyance means is/are controlled such that internal forces within a food product layer are minimized and/or such that a sliding height of the food product is minimized, wherein preferably the food product is discharged via the opening of the centrifuge element, to the discharge means and/or the food product is conveyed by the discharge means to the output of the device.

26. The method according to claim 17, wherein the food product is conveyed from different centrifuge elements by the discharge means to the output of the device, and/or the discharge means comprises at least two collecting means by which the food product is conveyed to the output or is conveyed to at least one intermediate element conveying the food product to the output.

27. The method according to claim 17, wherein the food product is provided as a fried product to the conveyance means via at least one fryer conveyance device and/or as a raw material and/or non-fried material to the conveyance means via at least one product providing means.

28. The device according to claim 2, wherein the length is telescopically alterable.

29. The device according to claim 3, wherein the supply means is alternatively positionable at least partly in one of the centrifuge elements and/or is actuatable in reverse directions.

30. The device according to claim 4, wherein the dividing element conveys the food product alternatively by reverse direction actuation.

31. The device according to claim 6, wherein the hinged connection is located between the supply means and the dividing element.

32. The device according to claim 7, wherein the first valve means comprises at least one rotary valve and/or rotary air lock.

33. The device according to claim 8, wherein the centrifuge element comprises only one single opening, and/or wherein in a filling position and/or a centrifuging position of the centrifuge element the opening is mainly oriented upwards and/or in a discharging position of the centrifuge element mainly oriented downwards.

34. The device according to claim 9, wherein the inner diameter of the opening is about 70% to 90%, about 75% to 85% and/or about 80% of the inner diameter of the interior space, the opening has a cone angle ($\phi$) of 20° to 40°, of 25° to 35°, and/or of about 33.5° with respect to the first rotational axis, the opening has a cone length (y–x), with x being a height of a side wall of the centrifuge element, of 10% to 50%, of 20% to 40%, and/or of about 30% of the height (y) of the centrifuge element, and/or a cone length of about 120 mm to 200 mm, of about 140 mm to 180 mm and/or of about 160 mm, when the inner diameter (D) of the interior space is about 1200 mm, and/or the supply means is inclined by an angle (a) with respect to a horizontal axis and/or a plane of the opening, wherein the angle (a) fulfills the relationship $$\sin\alpha = \frac{y}{d*k},$$

with y being the height of the centrifuge element, d being the inner diameter of the opening and k being a constant in a range of 0.83 to 0.91, of 0.85 to 0.89 and/or of about 0.87.

35. The device according to claim 10, wherein the bottom wall is located opposite to the opening; the side wall is cylindrical, elliptical and/or circular; above the bottom wall, at least one, at least partly interchangeable, bottom plate is located; and/or the corner between the bottom wall and/or the bottom plate on the one side and the side wall on the other side is at least partly rounded with a radius (r).

36. The device according to claim 35, wherein the radius (r) is about 100 mm to 150 mm, and/or about 120 mm, and/or the cone length (y–x), with x being a height of a side wall of the centrifuge element, the height (y) of the centrifuge element and the radius (r) fulfill the relationship $$\frac{y-x}{y-r} = k_1,$$

with $k_1$ being 0.6 to 0.5, 0.35 to 0.45 and/or about 0.4, and/or $$\frac{x-r}{y-r} = k_2,$$

with $k_2$ being 0.5 to 0.7, 0.55 to 0.65 and/or about 0.6.

37. The device according to claim 12, wherein the third rotational axis is mainly perpendicular to the first rotational axis, being mainly parallel to the second rotational axis, running at least partly through the interior space, being located between the bottom wall and/or the bottom plate and the opening.

38. The device according to claim 37, wherein the third rotational axis is located when the inner diameter (D) of the interior space is about 1200 mm, 2% to 3%, 2.5% to 3.5%, and/or about 4% of the height (y) of the centrifuge element and/or 5% to 50%, 7.5% to 30%, and/or about 10% of the radius (r) of the corner, and/or above the bottom wall and/or the bottom plate, running between the side walls and/or intersecting the first rotational axis.

39. The device according to claim 37, wherein the layer of material is provided as a cover of the bottom wall, the bottom plate, the side wall and/or the corner.

40. The device according to claim 13, wherein by the discharge means the food product transferred from different centrifuge elements is conveyable to one output of the device, and/or the discharge means comprises at least two collecting means by which the food product is conveyed to the output and/or is conveyed to an intermediate element conveying the food product to the output.

41. The device according to claim 14, wherein the second valve means comprises at least on rotary valve and/or a rotary air lock, and/or wherein the food product is conveyable by the collecting means and/or the intermediate element to the second valve means and/or into the air lock device, and/or the food product is conveyable by at least one air lock conveyance element and/or the second valve means to an air lock exit, and/or onto a product output device.

42. The method according to claim 22, wherein while the food product is conveyed to a first centrifuge element, and/or when the supply means is located at least partly within the interior space of the first centrifuge element, at least one second centrifuge element is spun with the first speed around its first rotational axis.

43. The method according to claim 42, wherein when the second centrifuge element is spun with the first speed the supply means is located outside the interior space of the second centrifuge element, and/or wherein when the second centrifuge element is in or is brought into a discharging position, the acceleration to the first speed and/or deceleration from the first speed is controlled to reduce relative movement between the food product and the centrifuge element and/or to reduce relative movement of single pieces of the food product relative to each other.

44. The method according to claim 24 wherein the food product is placed onto the already existing layer of food product within the centrifuge element.

45. The method according to claim 25, wherein the food product is conveyed from the centrifuge element to the discharge means, from one element of the discharge means to another element of the discharge means and/or from the discharge means to the output by a sliding movement and/or with a minimized drop height, and/or a drop height below 150 mm, and/or below 100 mm.

* * * * *